(12) United States Patent
Wu et al.

(10) Patent No.: US 12,387,886 B2
(45) Date of Patent: Aug. 12, 2025

(54) FIVE-WAY KEY AND DISPLAY DEVICE

(71) Applicant: QISDA (SUZHOU) CO., LTD., Jiangsu (CN)

(72) Inventors: Hao Wu, Suzhou (CN); Siwei Zhou, Suzhou (CN)

(73) Assignee: QISDA (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/264,637

(22) PCT Filed: Sep. 14, 2022

(86) PCT No.: PCT/CN2022/118691
§ 371 (c)(1),
(2) Date: Aug. 8, 2023

(87) PCT Pub. No.: WO2024/055189
PCT Pub. Date: Mar. 21, 2024

(65) Prior Publication Data
US 2025/0029798 A1    Jan. 23, 2025

(51) Int. Cl.
*H01H 13/14* (2006.01)
*G06F 3/02* (2006.01)

(52) U.S. Cl.
CPC .......... *H01H 13/14* (2013.01); *G06F 3/0202* (2013.01)

(58) Field of Classification Search
CPC ........ H01H 13/14; H01H 21/22; H01H 21/24; H01H 25/04; H01H 25/041; H01H 2025/048; H01H 2221/012; G06F 3/0202; G06F 3/02
See application file for complete search history.

(56) References Cited

U.S. PATENT DOCUMENTS

| | | | | |
|---|---|---|---|---|
| 7,488,914 | B2 * | 2/2009 | Kahnert | H01H 13/14 200/538 |
| 7,592,554 | B2 * | 9/2009 | Onodera | G05G 9/047 200/6 A |
| 2010/0133073 | A1 * | 6/2010 | Su | H01H 25/041 200/4 |

FOREIGN PATENT DOCUMENTS

| | | |
|---|---|---|
| CN | 204117913 U | 1/2015 |
| CN | 109114085 A | 1/2019 |
| CN | 216487777 U | 5/2022 |
| JP | H0224925 A | 1/1990 |

OTHER PUBLICATIONS

International Search Report issued on Apr. 28, 2023, in corresponding International Application No. PCT/CN2022/118691, 5 pages.

* cited by examiner

*Primary Examiner* — Lheiren Mae A Caroc
(74) *Attorney, Agent, or Firm* — Maier & Maier, PLLC

(57) ABSTRACT

A five-way key and a display device. A keycap of the five-way key includes a cap body and at least two clamping ribs, where a bottom end of the cap body is provided with an open receiving cavity, and the at least two clamping ribs are arranged on an inner wall of the receiving cavity and are used for clamping a push rod of the five-way key in an interference fit mode. According to the embodiments, the keycap is tightly connected with the push rod of the five-way key in an interference fit mode, so that a user can flexibly and accurately operate the five-way key, the problem complex assembly of existing five-way keys is avoided, and the defective rate is reduced.

16 Claims, 4 Drawing Sheets

FIVE-WAY KEY AND DISPLAY DEVICE

TECHNICAL FIELD

The application relates to the technical field of five-way keys, in particular to a five-way key and a display device.

BACKGROUND

Computers, liquid crystal displays, mobile phones and similar products, such as direction controllers of game machines and mobile phone rollers are developing towards a function concentration direction, which features integration of multiple operation functions on one function key. Five-way keys are widely used in mobile phones, computers, liquid crystal displays and other electronic devices because of they are convenient and flexible to operate and occupy a small space.

A keycap of an existing five-way key is fixed on a push rod, and the push rod and the keycap are fixed in such a way that glue undergoes a polyaddition chemical reaction under the catalysis of trace water in the air to realize bonding. The existing five-way key has the disadvantages that the assembly process is complex, the defective rate and cost are high, the keycap is poor in universality, and the keycap cannot be replaced when damaged.

The content in the background art is only the technology known to the inventor, and does not represent the prior art in this field.

SUMMARY

The application aims to provide a five-way key and a display device, so as to overcome the disadvantages of an existing five-way key that the assembly process is complex, the defective rate and cost are high, a keycap is poor in universality, and the keycap cannot be replaced when damaged.

According to one aspect of the application, a five-way key is provided. A five-way key comprising a keycap, wherein the keycap comprises a cap body and at least two clamping ribs, wherein a bottom end of the cap body is provided with an open receiving cavity, and the at least two clamping ribs are arranged on an inner wall of the receiving cavity and are used for clamping a push rod of the five-way key in an interference fit manner.

According to some embodiments, the cap body and the at least two clamping ribs are integrally formed.

According to some embodiments, the at least two clamping ribs comprise two pairs of clamping ribs, wherein the clamping ribs are distributed on the inner wall of the receiving cavity with a 90° angle between adjacent clamping ribs.

According to some embodiments, the at least two clamping ribs comprise straight clamping ribs with clamping surfaces, wherein a normal of the clamping surface points to an axial center along a radial direction of the receiving cavity.

According to some embodiments, an arc-shaped elastic arm is arranged between the straight clamping ribs.

According to some embodiments, the straight clamping ribs are slightly deformed and the arc-shaped elastic arm is deformed outward, so that the push rod of the five-way key is sandwiched between the straight clamping ribs.

According to some embodiments, the at least two clamping ribs comprise oblique clamping ribs inclined clockwise in a circumferential direction of the receiving cavity.

According to some embodiments, the oblique clamping ribs are slightly deformed in the inclined direction and the arc-shaped elastic arm is deformed outward, so that the push rod of the five-way key is sandwiched between the oblique clamping ribs.

According to some embodiments, the oblique clamping ribs are inclined clockwise by 45°-60° in the circumferential direction of the receiving cavity.

According to some embodiments, an open end of the receiving cavity is provided with a chamfer for the push rod of the five-way key to enter the receiving cavity.

According to one aspect of the application, a display device is provided, comprising the five-way key as described above.

According to the five-way key and the display device, the straight clamping ribs or oblique clamping ribs are arranged on the inner wall of the receiving cavity of the keycap, allowing the push rod of the five-way key to be received in the receiving cavity of the keycap in an interference fit manner, so that the assembly process of the five-way key is simple, the processing and assembly cost is reduced, and the yield is improved; besides, the universality of the keycap of the five-way key is good, and the keycap can be replaced when damaged.

For a better understanding of the features and technical content of the application, please refer to the following detailed description and drawings of the application, but the description and drawings are only used to illustrate the application, but do not limit the scope of protection of the application in any way.

BRIEF DESCRIPTION OF THE DRAWINGS

The implementations of the invention will be described in detail with reference to the accompanying drawings. Here, the drawings that form a part of the disclosure are used to provide a further understanding of the disclosure. The illustrative embodiments of the disclosure and their description are used to explain the disclosure, and do not constitute an improper limitation of the disclosure. In the drawings.

DETAILED DESCRIPTION OF EMBODIMENTS

Figure 1:
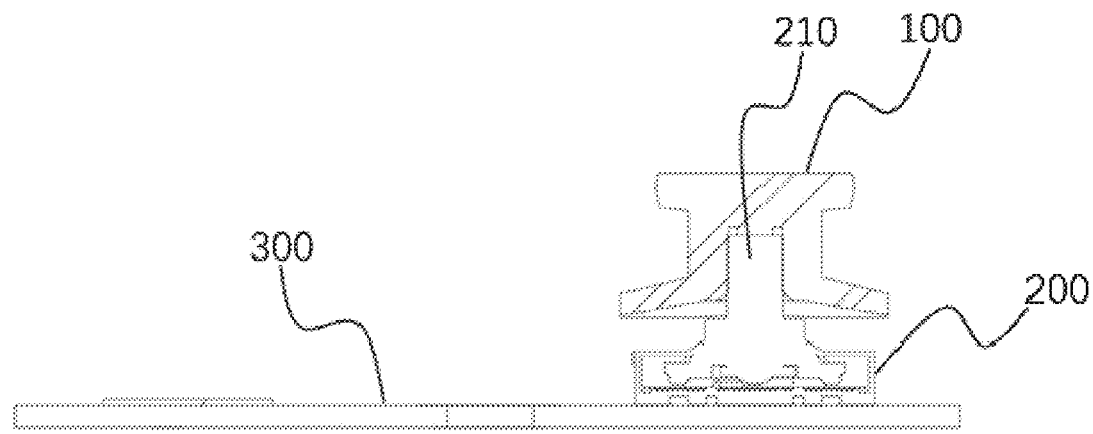
FIG. 1 shows a structural diagram of a five-way key after assembly according to an exemplary embodiment of the application.

Only some exemplary embodiments are briefly described below. As those skilled in the art can realize that the described embodiments can be modified in various different ways without departing from the spirit or scope of the invention. Therefore, the drawings and description are to be regarded as illustrative rather than restrictive in nature.

In the description of the invention, it should be understood that directional or positional relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise" and "counterclockwise" are based on the directional or positional relationships shown in the drawings, which are only for the convenience of describing the invention and simplifying the description, but do not indicate or imply that the referred devices or elements must have a specific orientation or be constructed and operated in a specific orientation, so they cannot be understood as limiting the invention. Further, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. In the description of this invention, "multiple" means two or more, unless otherwise specifically defined.

In the description of the invention, it should be noted that the terms "install" and "connect" should be understood in a broad sense unless otherwise specified and defined. For example, it can be fixed connection, detachable connection or integrated connection; it can be mechanical connection or electric connection or communication; and it can be direct connection, indirect connection through intermediate media or internal communication of two elements or interaction of two elements. For those of ordinary skill in the art, the specific meaning of the terms mentioned above in the present invention should be construed to specific circumstances.

In the invention, unless otherwise explicitly specified and limited, the first feature being "above" or "below" the second feature may include direct contact between the first and second features, or may also include that the first and second features are not in direct contact but are in contact through other features therebetween. Further, the first feature being "above" the second feature includes that the first feature is directly above and obliquely above the second feature, or simply indicates that the first feature is higher in horizontal height than the second feature. The first feature being "below" the second feature includes that the first feature is directly below and obliquely below the second feature, or simply indicates that the first feature is lower in horizontal height than the second feature.

The following provides many different embodiments or examples for implementing different structures of the present invention. In order to simplify the disclosure of the present invention, components and arrangements of specific examples are described below. Of course, they are only examples and are not intended to limit the present invention. In addition, the present invention may repeat reference numerals and/or reference letters in different examples, and such repetition is for the sake of simplicity and clarity, and does not itself indicate the relationship between the various embodiments and/or arrangements discussed. In addition, the present invention provides examples of various specific processes and materials, but those of ordinary skill in the art can realize the application of other processes and/or the use of other materials.

With the popularization of touch panel technology, keys on a display tend to be replaced by a five-way key, because the original keys on the display can only be used in a simple control interface or multiple keys need to be installed and integrated with software and hardware control. A smarter control interface can be realized by using a five-way key in a display.

At present, five-way keys are generally installed on liquid crystal displays in the market, and a keycap needs to be installed on a push rod of the five-way key. The manufacturing process of the existing keycap is complicated. After being manufactured, the keycap needs to be installed on the push rod, glue needs to be dripped between the keycap and the push rod by a glue dispenser, and then a board is used for fixation. After the glue is preliminarily solidified, the function of the five-way key needs to be tested with the board removed, and after the glue is completely solidified, the hand feeling of the keycap needs to be tested. Due to the limited impact which can be borne by the five-way key, the keycap installed thereon needs to be higher than surrounding parts to achieve a good hand feeling. It can be seen that in the existing technical field of five-way keys, the process of assembling the keycap to the push rod is complicated, the defective rate and cost are high, the keycap is poor in universality, and the keycap cannot be replaced when damaged.

The application aims to solve the problems of the keycap of the existing technical field of five-way keys.

The preferred embodiments of the present invention will be described hereinafter with reference to the accompanying drawings. It should be understood that the preferred embodiments described here are only used to illustrate and explain the present invention, and are not used to limit the application.

Figure 2:
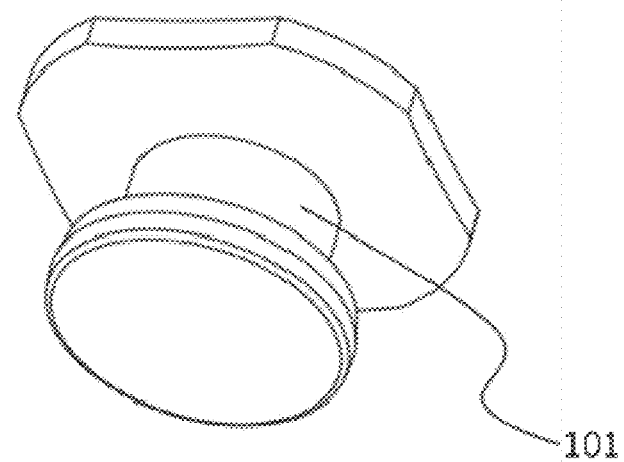
FIG. 2 shows a structural diagram of a keycap according to an exemplary embodiment of the application.

FIG. 1 shows a structural diagram of a five-way key after assembly according to an exemplary embodiment of the application. FIG. 2 shows a structural diagram of a keycap according to an exemplary embodiment of the application.

As shown in FIGS. 1-2, according to an exemplary embodiment of the application, the application discloses a five-way key. A keycap 100 of the five-way key comprises a cap body 101 and at least two clamping ribs, wherein a bottom end of the cap body 101 is provided with an open receiving cavity, and the at least two clamping ribs are arranged on an inner wall of the receiving cavity and are used for clamping a push rod 210 of the five-way key 200 in an interference fit manner.

In this application, at least two clamping ribs are arranged on the inner wall of the receiving cavity of the cap body 101, and a receiving space between the at least two clamping ribs can be slightly deformed, so that the push rod 210 of the five-way key 200 is inserted between the at least two clamping ribs, and the push rod 210 is sandwiched between the at least two clamping ribs in an interference fit manner through the slight deformation of the at least two clamping ribs. Therefore, the keycap 100 can be firmly fixed on the push rod 210 without glue, and the assembly process of the keycap 100 becomes simpler.

In this application, the at least two clamping ribs may be a pair of clamping ribs, which are oppositely arranged on the inner wall of the receiving cavity of the cap body 101, or two pairs of clamping ribs which are distributed on the inner wall of the receiving cavity with a 90° angle between adjacent clamping ribs. The number of the at least two clamping ribs is not specifically limited in this application, and can be determined according to the actual requirements of the keycap 100. In this application, two pairs of clamping ribs are arranged on the inner wall of the receiving cavity of the cap body 101. Of course, other angles can be formed between adjacent clamping ribs, as long as the same effect of interference fit between the clamping ribs and the push rod as achieved in this application can be realized. In this application, the clamping ribs arranged in pairs can be oppositely arranged on the inner wall of the receiving cavity of the cap body 101. In addition, the clamping ribs in this application may not be oppositely arranged, and adjacent clamping ribs can be formed in any angle, as long as the clamping ribs and the push rod can achieve interference fit. For example, three clamping ribs can be arranged and distributed on the inner wall of the receiving cavity of the cap body 101 with a 60° angle between adjacent clamping ribs (not shown).

In this application, the shape and size of the cap body 101 of the keycap 100 can be designed according to the requirements of actual products, which is not limited by this application. The existing keycap 100 has poor universality. As the five-way key 200 for different products have different requirements, each product requires a distinct keycap 100. However, the keycap 100 in this application is universal, and the cap body 101 can be designed in one shape, as long as at least two clamping ribs are provided to realize interference fit with the push rods 210 of the five-way key 200 of different models.

In addition, if the keycap 100 is damaged, the whole five-way key 200 may have to be replaced for an existing product, because it is glued together. However, in this application, the keycap 100 can be removed, so the keycap 100 can be replaced alone, thus reducing the cost of the whole product. Because the cap body 101 of the keycap 100 of the application can be slightly deformed, under the impact of an external force, the impact force can be buffered to protect the internal structure of the five-way key 200. Moreover, by making the cap body 101 with a slightly deformed material, the hand feeling can also be enhanced.

According to the embodiment of the application, the cap body 101 and the at least two clamping ribs are integrally formed, in other words, the keycap is integrally formed. The keycap 100 in this application can be processed through injection molding or 3D printing by using related product molds, which is not limited by this application, and the processing means can be determined according to the actual needs of the keycap 100.

The at least two clamping ribs in the application comprise straight clamping ribs 110 and oblique clamping ribs 130, and the straight clamping ribs 110 or the oblique clamping ribs 130 can penetrate through the receiving cavity of the whole cap body 101.

Figure 3:
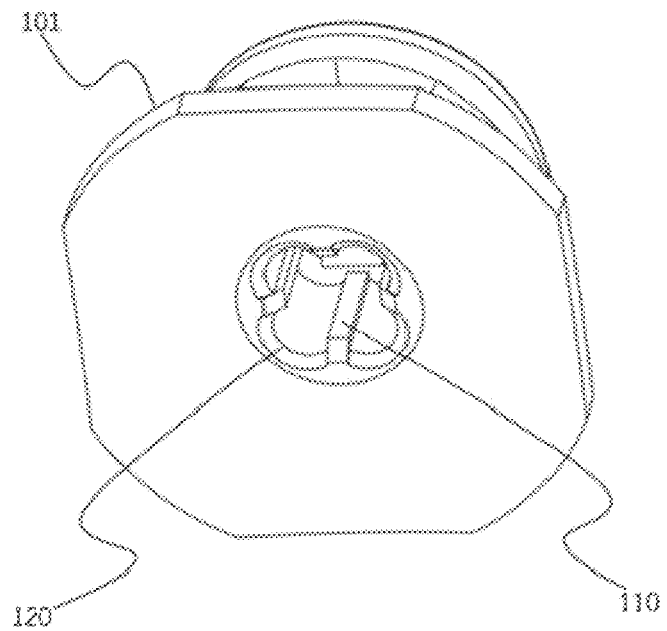
FIG. 3 shows a structural diagram of a keycap with straight clamping ribs according to an exemplary embodiment of the application.
Figure 4:
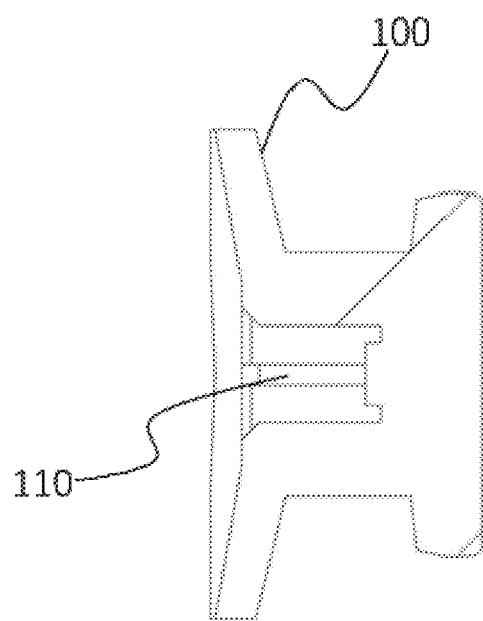
FIG. 4 shows a sectional view of a keycap with straight clamping ribs according to an exemplary embodiment of the application.
Figure 5:
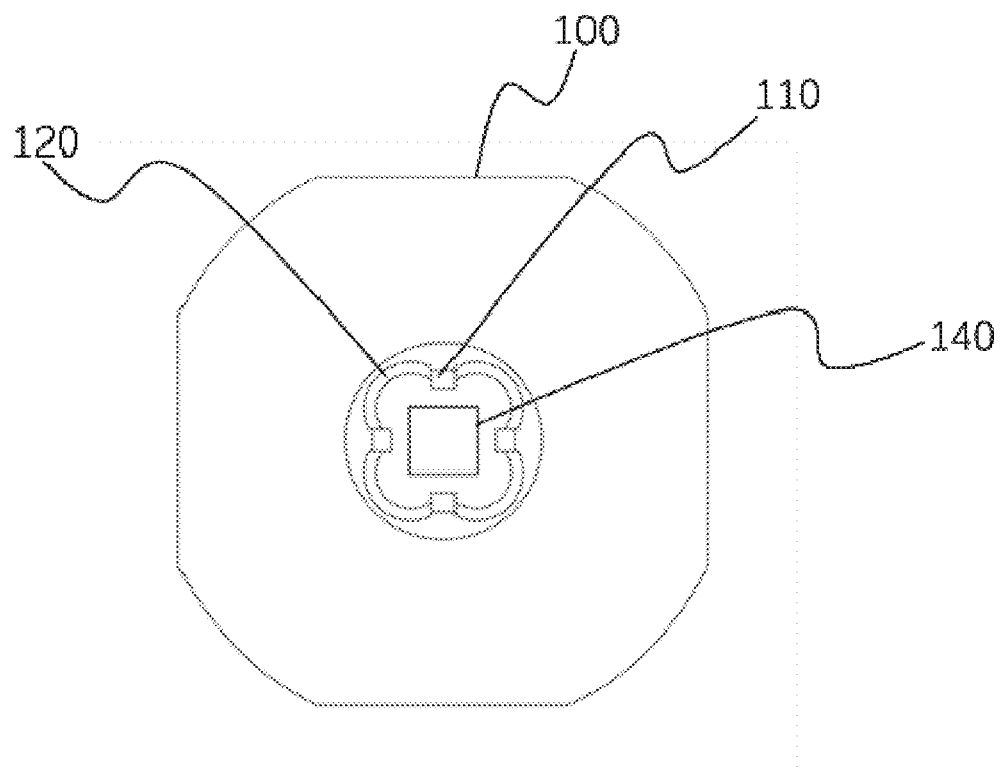
FIG. 5 shows a diagram of an assembled structure of a keycap with straight clamping ribs and a push rod according to an exemplary embodiment of the application.

FIG. 3 shows a structural diagram of a keycap with straight clamping ribs according to an exemplary embodiment of the application. FIG. 4 shows a sectional view of a keycap with straight clamping ribs according to an exemplary embodiment of the application. FIG. 5 shows a diagram of an assembled structure of a keycap with straight clamping ribs and a push rod according to an exemplary embodiment of the application.

As shown in FIGS. 3-5, according to the embodiment of the application, the at least two clamping ribs comprise straight clamping ribs 110 with clamping surfaces, and a normal of the clamping surface points to an axial center along a radial direction of the receiving cavity. An arc-shaped elastic arm 120 is arranged between adjacent straight clamping ribs 110. In this application, two pairs of straight clamping ribs 110 can be oppositely arranged on the inner wall of the receiving cavity of the cap body 101.

In this application, the two pairs of straight clamping ribs 110 are distributed on the inner wall of the receiving cavity with a 90° angle between adjacent clamping ribs. Of course, the number of pairs of straight clamping ribs 110 is not limited in this application, and can be determined according to actual needs. Alternatively, one pair of straight clamping ribs 110 can be oppositely arranged on the inner wall of the receiving cavity of the cap body 101. By arranging the arc-shaped elastic arm 120 between the straight clamping ribs 110, the clamping force of the straight clamping ribs 110 is greater and the elasticity is better.

The arc-shaped elastic arm 120 arches toward the outside of the receiving cavity of the cap body 101, and the clamping force of the straight clamping ribs 110 can be changed with the arching magnitude. An end of the arc-shaped elastic arm 120 is connected to a side surface of the straight clamping rib 110, and the side surfaces are two sides adjacent to a surface abutting against the push rod 210. The clamping force of the straight clamping ribs 110 can be adjusted by changing the radian of the arc-shaped elastic arm 120. In this application, the tangent of the radian of the end of the arc-shaped elastic arm 120 can be perpendicular to the side surface of the straight clamping rib 110, or an angle is formed between the tangent of the radian of the end of the arc-shaped elastic arm 120 and the side surface of the straight clamping rib 110.

When the push rod 210 of the five-way key 200 is inserted between the straight clamping ribs 110, the straight clamping ribs 110 are slightly deformed and the arc-shaped elastic arm 120 is deformed outward. At this point, the fit size of the receiving cavity of the cap body 101 is the same as the size of the push rod 210, so that the push rod 210 can be clamped between the straight clamping ribs 110. Therefore, it is more convenient to assemble and disassemble the keycap 100 and the push rod 210, and the five-way key 200 can be assembled and disassembled through physical change.

In this application, a bottom of the receiving cavity of the cap body 101 is provided with a boss 140. When the push rod 210 is inserted into the receiving cavity of the cap body 101, the boss 140 abuts against the top of the push rod 140, and the boss 140 play a role in maintaining the embedding depth of the push rod 210 in the receiving cavity, as can be seen in FIGS. 4-5.

In this application, an open end of the receiving cavity on the cap body 101 is provided with a chamfer for guiding the push rod 210 of the five-way key 200 into the receiving cavity, which makes assembly easier.

The material of the keycap 100 can be ABS resin, so that the keycap 100 can be slightly deformed.

Figure 6:
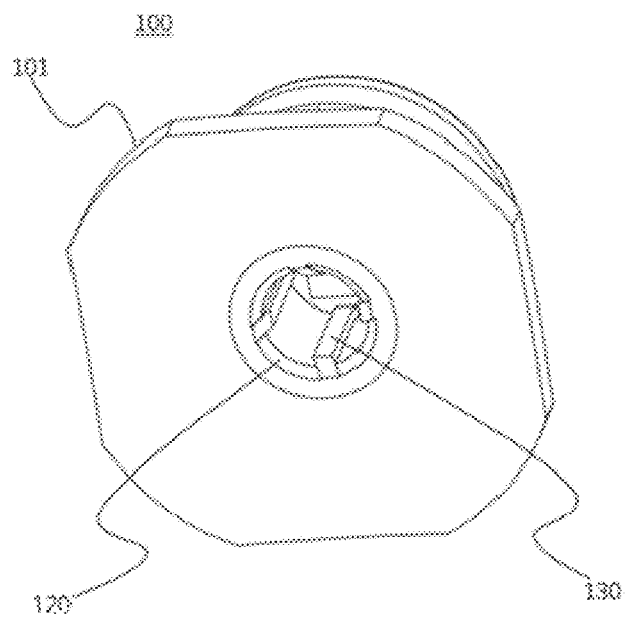
FIG. 6 shows a structural diagram of a keycap with oblique clamping ribs according to an exemplary embodiment of the application.
Figure 7:
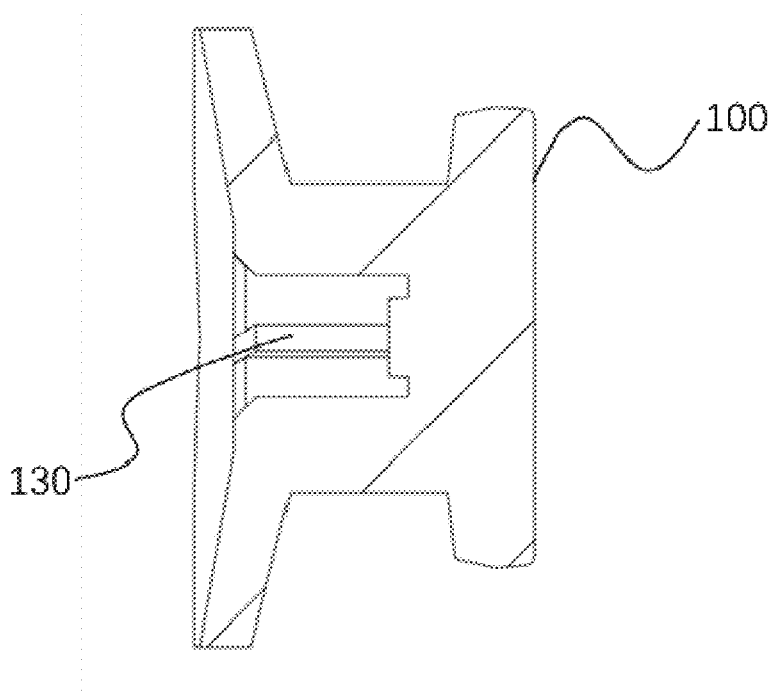
FIG. 7 shows a sectional view of a keycap with oblique clamping ribs according to an exemplary embodiment of the application.
Figure 8:
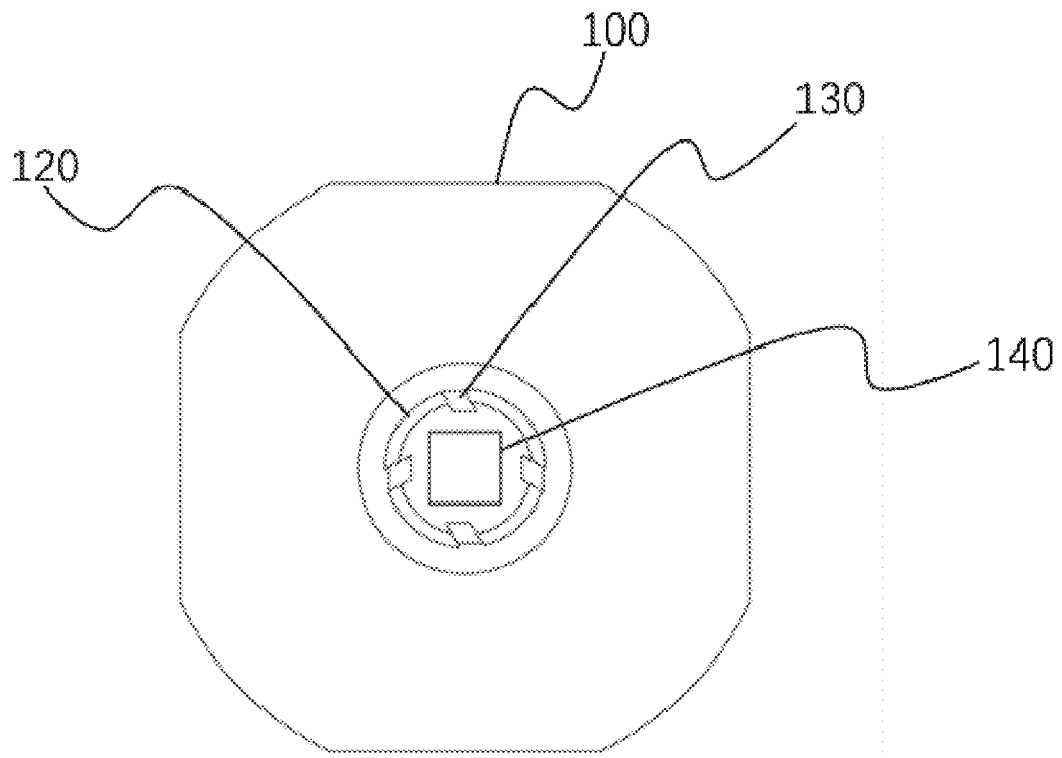
FIG. 8 shows a diagram of an assembled structure of a keycap with oblique clamping ribs and a push rod according to an exemplary embodiment of the application.

FIG. 6 shows a structural diagram of a keycap with oblique clamping ribs according to an exemplary embodiment of the application. FIG. 7 shows a sectional view of a keycap with oblique clamping ribs according to an exemplary embodiment of the application. FIG. 8 shows a diagram of an assembled structure of a keycap with oblique clamping ribs and a push rod according to an exemplary embodiment of the application.

As shown in FIGS. 6-8, according to the embodiment of the application, the at least two clamping ribs comprise oblique clamping ribs 130, which are inclined clockwise in a circumferential direction of the receiving cavity, and a normal of a clamping surface of the oblique clamping rib 130 points to an axial center along a radial direction of the receiving cavity. In this application, two pairs of oblique clamping ribs 130 can be oppositely arranged on the inner wall of the receiving cavity of the cap body 101.

An arc-shaped elastic arm 120 can also be arranged between adjacent oblique clamping ribs 130 in this application.

In this application, the two pairs of oblique clamping ribs 130 are distributed on the inner wall of the receiving cavity with a 90° angle between adjacent clamping ribs. Of course, the number of pairs of oblique clamping ribs 130 is not limited in this application, and can be determined according to actual needs. Alternatively, one pair of oblique clamping ribs 130 can be inclined clockwise and oppositely arranged on the inner wall of the receiving cavity of the cap body 101. By arranging the arc-shaped elastic arm 120 between the oblique clamping ribs 130, the clamping force of the oblique clamping ribs 130 is greater and the elasticity is better.

Optionally, the arc-shaped elastic arm 120 arches toward the outside of the receiving cavity of the cap body 101, and the clamping force of the oblique clamping ribs 130 can be changed with the arching magnitude. An end of the arc-shaped elastic arm 120 is connected to a side surface of the oblique clamping rib 130, and the side surfaces are two sides adjacent to a surface abutting against the push rod 210. The clamping force of the oblique clamping ribs 130 can be adjusted by changing the radian of the arc-shaped elastic arm 120. In this application, the tangent of the radian of the end of the arc-shaped elastic arm 120 can be perpendicular to the inclined side surface of the oblique clamping rib 130, or an angle is formed between the tangent of the radian of the end of the arc-shaped elastic arm 120 and the inclined side surface of the oblique clamping rib 130.

When the push rod 210 of the five-way key 200 is inserted between the oblique clamping ribs 130, the oblique clamping ribs 130 are slightly deformed in the inclined direction and the arc-shaped elastic arm 120 is deformed outward. At this point, the fit size of the receiving cavity of the cap body 101 is the same as the size of the push rod 210, so that the push rod 210 can be clamped between the oblique clamping ribs 130. Therefore, it is more convenient to assemble and disassemble the keycap 100 and the push rod 210, and the five-way key 200 can be assembled and disassembled through physical change.

According to the embodiment of the application, the oblique clamping ribs 130 are inclined clockwise by 45°-60° in the circumferential direction of the receiving cavity. In this application, when the inclination angle is 60°, the clamping effect of the oblique clamping ribs 130 is better.

In this application, a bottom of the receiving cavity of the cap body 101 is provided with a boss 140. When the push rod 210 is inserted into the receiving cavity of the cap body 101, the boss 140 abuts against the top of the push rod 140, and the role of the boss 140 is to maintain the embedding depth of the push rod 210 in the receiving cavity, as can be seen in FIGS. 7-8.

According to the embodiment of the application, an open end of the receiving cavity on the cap body 101 is provided with a chamfer for guiding the push rod 210 of the five-way key 200 into the receiving cavity, which makes assembly easier.

The material of the keycap 100 can be ABS resin, so that the keycap 100 can be slightly deformed.

According to the five-way key 200 in this application, the keycap 100 is assembled on the push rod 210 of the five-way key 200, and interference fit is formed between the keycap 100 and the push rod 210. The push rod 210 of the five-way key 200 in this application can be square or round, so the keycap 100 in this application has good versatility. The five-way key 200 is electrically connected to a PCBA board 300 of a liquid display. The five-way key 200 can be used as a five-way switch of the liquid display, and the operation function of the five-way key 200 can be realized by changing the direction of the push rod 210.

According to an exemplary embodiment of the application, a display device is disclosed, comprising the keycap 100 as described above. Based on the above description of the keycap 100 of the application, the keycap 100 of the application can be applied to the display device and keys thereof, so as to solve the problem of complicated assembly process of existing keys, reduce the cost, improve the yield, improve the universality of the keycap 100 of the key, and make the keycap 100 replaceable in case of damage.

Finally, it should be noted that the above are only exemplary embodiments of the disclosure, and not intended to limit the disclosure. Although the disclosure is described in detail with reference to the foregoing embodiments, it is still possible for those skilled in the art to modify the technical schemes of the foregoing embodiments or replace some of the technical features therein equivalently. Any modification, equivalent substitution, improvement, etc. made within the spirit and principle of the disclosure should be included in the protection scope of the disclosure.

What is claimed is:

1. A five-way key, comprising: a keycap, wherein the keycap comprises:
    a cap body, with a bottom end of the cap body being provided with an open receiving cavity; and
    at least two clamping ribs arranged on an inner wall of the receiving cavity and used for clamping a push rod of the five-way key in an interference fit manner;
    wherein the at least two clamping ribs comprise straight clamping ribs with clamping surfaces, wherein a normal of the clamping surface points to an axial center along a radial direction of the receiving cavity; and an arc-shaped elastic arm is arranged between the straight clamping ribs.

2. The five-way key according to claim 1, wherein the cap body and the at least two clamping ribs are integrally formed.

3. The five-way key according to claim 1, wherein the at least two clamping ribs comprise:
    two pairs of clamping ribs, wherein the clamping ribs are distributed on the inner wall of the receiving cavity with a 90° angle between adjacent clamping ribs.

4. The five-way key according to claim 1, wherein the straight clamping ribs are slightly deformed and the arc-shaped elastic arm is deformed outward, so that the push rod of the five-way key is sandwiched between the straight clamping ribs.

5. The five-way key according to claim 1, wherein the at least two clamping ribs comprise:
    oblique clamping ribs inclined clockwise in a circumferential direction of the receiving cavity.

6. The five-way key according to claim 5, wherein the oblique clamping ribs are slightly deformed in the inclined direction and the arc-shaped elastic arm is deformed outward, so that the push rod of the five-way key is sandwiched between the oblique clamping ribs.

7. The five-way key according to claim 5, wherein the oblique clamping ribs are inclined clockwise by 45°-60° in the circumferential direction of the receiving cavity.

8. The five-way key according to claim 1, wherein an open end of the receiving cavity is provided with a chamfer for the push rod of the five-way key to enter the receiving cavity.

9. A display device, wherein the display device comprises a five-way key comprising a keycap, and the keycap comprises:
   a cap body, with a bottom end of the cap body being provided with an open receiving cavity; and
   at least two clamping ribs arranged on an inner wall of the receiving cavity and used for clamping a push rod of the five-way key in an interference fit manner,
   wherein the at least two clamping ribs comprise straight clamping ribs with clamping surfaces, wherein a normal of the clamping surface points to an axial center along a radial direction of the receiving cavity; and an arc-shaped elastic arm is arranged between the straight clamping ribs.

10. The display device according to claim 9, wherein the cap body and the at least two clamping ribs are integrally formed.

11. The display device according to claim 9, wherein the at least two clamping ribs comprise:
   two pairs of clamping ribs, wherein the clamping ribs are distributed on the inner wall of the receiving cavity with a 90° angle between adjacent clamping ribs.

12. The display device according to claim 9, wherein the straight clamping ribs are slightly deformed, and the arc-shaped elastic arm is deformed outward, so that the push rod of the five-way key is sandwiched between the straight clamping ribs.

13. The display device according to claim 9, wherein the at least two clamping ribs comprise:
   oblique clamping ribs inclined clockwise in a circumferential direction of the receiving cavity.

14. The display device according to claim 13, wherein the oblique clamping ribs are slightly deformed in the inclined direction and the arc-shaped elastic arm is deformed outward, so that the push rod of the five-way key is sandwiched between the oblique clamping ribs.

15. The display device according to claim 13, wherein the oblique clamping ribs are inclined clockwise by 45°-60° in the circumferential direction of the receiving cavity.

16. The display device according to claim 9, wherein an open end of the receiving cavity is provided with a chamfer for the push rod of the five-way key to enter the receiving cavity.

* * * * *